(12) United States Patent
Araújo et al.

(10) Patent No.: US 11,587,285 B2
(45) Date of Patent: Feb. 21, 2023

(54) HEAD-MOUNTED DISPLAY AND METHOD THEREOF

(71) Applicant: Telefonaktiebolaget LM Ericsson (publ), Stockholm (SE)

(72) Inventors: José Araújo, Stockholm (SE); Gunilla Berndtsson, Nacka (SE); Volodya Grancharov, Solna (SE); Alvin Jude Hari Haran, Sunnyvale, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 667 days.

(21) Appl. No.: 16/322,428

(22) PCT Filed: Jun. 4, 2018

(86) PCT No.: PCT/EP2018/064592
§ 371 (c)(1),
(2) Date: Jan. 31, 2019

(87) PCT Pub. No.: WO2019/185173
PCT Pub. Date: Oct. 3, 2019

(65) Prior Publication Data
US 2021/0335032 A1    Oct. 28, 2021

Related U.S. Application Data

(60) Provisional application No. 62/649,106, filed on Mar. 28, 2018.

(51) Int. Cl.
*G06T 17/00*        (2006.01)
*G06T 7/20*         (2017.01)
(Continued)

(52) U.S. Cl.
CPC .............. *G06T 17/00* (2013.01); *G06F 3/012* (2013.01); *G06T 7/20* (2013.01); *H04N 7/04* (2013.01);
(Continued)

(58) Field of Classification Search
CPC .................................. G06T 17/00; G06T 7/20
See application file for complete search history.

(56) References Cited

U.S. PATENT DOCUMENTS

| 9,288,468 B2 | 3/2016 | Vaught et al. |
| 2008/0122958 A1* | 5/2008 | Huseth ............ G08B 13/19689 |
| | | 348/E7.086 |

(Continued)

FOREIGN PATENT DOCUMENTS

| CO | 07132122 | 3/2009 |
| EP | 1564585 B1 | 6/2007 |

(Continued)

OTHER PUBLICATIONS

International Search Report and Written Opinion of the International Searching Authority, PCT/EP2018/064592/, dated Jan. 2, 2019, 14 pages.

(Continued)

*Primary Examiner* — Yi Yang
(74) *Attorney, Agent, or Firm* — Sage Patent Group (57) ABSTRACT

A Head-Mounted Display (HMD) is provided which comprises a camera configured to capture a video of a real-world scene with a first field-of-view (FoV), a network interface circuit configured to stream video to a receiving display device, and processing means which is operative to generate a 3D model of the real-world scene, and to generate a video from the 3D model using a second FoV which is wider than the first FoV. The processing means is further operative to estimate a motion of the camera, and to stream the generated (Continued)

video to the receiving display device if the estimated motion of the camera satisfies one or more conditions indicative of rapid motion, else stream the captured video to the receiving display device.

19 Claims, 4 Drawing Sheets

(51) Int. Cl.
*G06F 3/01* (2006.01)
*H04N 7/04* (2006.01)
*H04L 65/61* (2022.01)

(52) U.S. Cl.
CPC .... *G06T 2207/10016* (2013.01); *H04L 65/61* (2022.05)

(56) References Cited

U.S. PATENT DOCUMENTS

| | | | |
|---|---|---|---|
| 2013/0002813 A1* | 1/2013 | Vaught | H04N 13/161 348/43 |
| 2014/0268356 A1 | 9/2014 | Bolas et al. | |
| 2015/0003819 A1 | 1/2015 | Ackerman et al. | |
| 2016/0011419 A1 | 1/2016 | Gao | |
| 2017/0041544 A1* | 2/2017 | Kobayashi | G02B 27/017 |
| 2018/0144547 A1* | 5/2018 | Shakib | G06T 15/60 |

FOREIGN PATENT DOCUMENTS

| | | |
|---|---|---|
| JP | 2017518547 A | 7/2017 |
| KR | 20170044319 A | 4/2017 |
| WO | WO 2007/010411 A3 | 1/2007 |
| WO | WO 2013/003706 A2 | 1/2013 |

OTHER PUBLICATIONS

Fernandes, A. S., et al., "Combating VR Sickness Through Subtle Dynamic Field-Of-View Modification," IEEE Symposium on 3D User Interfaces, Mar. 19-20, 2016, Greenville, SC, USA, (XP055439351) pp. 201-210.

Berger, M., et al., "A Survey Of Surface Reconstruction From Point Clouds," Computer Graphics Forum, vol. 0 (1981) No. 0, (© 2016 Author Version) pp. 1-27.

Newcombe, R., et al., "KinectFusion: Real-Time Dense Surface Mapping And Tracking," IEEE International Symposium on Mixed and Augmented Reality 2011, Science and Technology Proceedings, Oct. 26-29, 2011, Basel, Switzerland, pp. 127-136.

Columbian Office Action, Columbian Patent Application No. 14281, dated Nov. 19, 2020, 10 pages.

S. Orts-Escolan. "Holoportation: Virtual 3D Teleportation in Real-time". Proceedings of the 29th Annual Symposium on User Interface Software and Technology (UIST '16), pp. 741-754, https://dl.acm.org/doi/10.1145/2984511.2984517.

Russian Office Action, Russian Patent Application No. 2020135148, dated Apr. 16, 2021, 6 pages.

First Examination Report, Indian Patent Application No. 202017028039, dated Aug. 25, 2021, 7 pages.

Nie, G., et al., "Prevention of Visually Induced Motion Sickness Based On Dynamic Real-Time Content-Aware Non-Salient Area Blurring," 2017 IEEE International Symposium on Mixed and Augmented Reality Adjust Proceedings, Dec. 31, 2017, 4 pages.

* cited by examiner

HEAD-MOUNTED DISPLAY AND METHOD THEREOF

CROSS REFERENCE TO RELATED APPLICATIONS

This application is a 35 U.S.C. § 371 national stage application of PCT International Application No. PCT/EP2018/064592, filed on Jun. 4, 2018, which claims the benefit of U.S. Provisional Patent Application Ser. No. 62/649,106, filed on Mar. 28, 2018, the disclosures and content of which are incorporated by reference herein in their entireties.

TECHNICAL FIELD

The invention relates to a Head-Mounted Display (HMD), a method performed by an HMD, a corresponding computer program, and a corresponding computer-readable storage medium.

BACKGROUND

Head-Mounted Displays (HMDs) or similar devices can be used in visual remote-guidance applications. For instance, a support engineer visiting a site for serving a radio base station may wear an HMD comprising a front-facing camera which captures a video of the physical real-world scene which the support engineer is viewing, such as a radio base station cabinet. The HMD may be used for displaying relevant documentation to the support engineer, while at the same time streaming the captured video to a remote location, e.g., to a Network Operations Center (NOC), where it is viewed by an expert who is guiding and/or assisting the support engineer.

Owing to the limited Field-of-View (FoV) of the camera comprised in the HMD, the person viewing the video captured by the HMD camera only has a limited FoV of the site visited by the support engineer. In particular, this is the case if the HMD camera is zoomed-in to provide a close-up view of the equipment to be serviced.

As a result of the limited FoV of the captured video, the person watching the captured video may suffer from Visually Induced Motion Sickness (VIMS), In particular, this is the case if the HMD camera is moving rapidly, e.g., if the support engineer rotates his/her head or changes position rapidly. Generally, VIMS is caused by motion which is seen but not felt. Due to the limited FoV, only a subset of visual reference points in the real-world scene are captured by the video.

SUMMARY

It is an object of the invention to provide an improved alternative to the above techniques and prior art.

More specifically, it is an object of the invention to provide improved solutions for visual remote guidance applications. In particular, it is an object of the invention to provide solutions for visual remote collaboration which mitigate the risk of VIMS.

These and other objects of the invention are achieved by means of different aspects of the invention, as defined by the independent claims. Embodiments of the invention are characterized by the dependent claims.

According to a first aspect of the invention, an HMD is provided. The HMD comprises a camera configured to capture a video of a real-world scene with a first FoV, a network interface circuit configured to stream video to a receiving display device, and processing means. The processing means is operative to generate a 3D model of the real-world scene and generate a video from the 3D model using a second FoV which is wider than the first FoV. The processing means is further operative to estimate a motion of the camera, and, if the estimated motion of the camera satisfies one or more conditions indicative of rapid motion, stream the generated video to the receiving display device, else, stream the captured video to the receiving display device.

According to a second aspect of the invention, a method performed by an HMD is provided. The method comprises capturing a video of a real-world scene with a first FoV using a camera comprised in the HMD, generating a 3D model of the real-world scene, and generating a video from the 3D model using a second FoV which is wider than the first FoV. The method further comprises estimating a motion of the camera, and, if the estimated motion of the camera satisfies one or more conditions indicative of rapid motion, streaming the generated video to a receiving display device using a network interface circuit comprised in the HMD, else, streaming the captured video to the receiving display device using the network interface circuit.

According to a third aspect of the invention, a computer program is provided. The computer program comprises computer-executable instructions for causing an HMD to perform the method according to an embodiment of the second aspect of the invention, when the computer-executable instructions are executed on a processing unit comprised in the HMD.

According to a fourth aspect of the invention, a computer-readable storage medium is provided. The computer-readable storage medium has stored thereon the computer program according to the third aspect of the invention.

The invention makes use of an understanding that the risk for a viewer of the video which is streamed by an embodiment of the HMD of suffering from VMS is mitigated by streaming a zoomed-out generated video, rather than the captured video, if the camera moves rapidly.

Even though advantages of the invention have in some cases been described with reference to embodiments of the first aspect of the invention, corresponding reasoning applies to embodiments of other aspects of the invention.

Further objectives of, features of, and advantages with, the invention will become apparent when studying the following detailed disclosure, the drawings, and the appended claims. Those skilled in the art realize that different features of the invention can be combined to create embodiments other than those described in the following.

BRIEF DESCRIPTION OF THE DRAWINGS

The above, as well as additional objects, features, and advantages of the invention, will be better understood through the following illustrative and non-limiting detailed description of embodiments of the invention, with reference to the appended drawings, in which.

All the figures are schematic, not necessarily to scale, and generally only show parts which are necessary in order to elucidate the invention, wherein other parts may be omitted or merely suggested.

DETAILED DESCRIPTION

The invention will now be described more fully herein after with reference to the accompanying drawings, in which certain embodiments of the invention are shown. This invention may, however, be embodied in many different forms and should not be construed as limited to the embodiments set forth herein. Rather, these embodiments are provided by way of example so that this disclosure will be thorough and complete, and will fully convey the scope of the invention to those skilled in the art.

The present invention relates to visual remote guidance, which in the present context encompasses capturing a video using a head-mounted camera worn by a first person, e.g., a support engineer wearing a Head-Mounted Display (HMD), and sharing the captured video (e.g., by streaming) with a second person viewing the captured video at a different, and potentially remote, location. The second person may, e.g., be an expert guiding and/or assisting the support engineer who is visiting a site which needs to be served, e.g., a radio base station or other equipment of a telecommunications network. Whilst embodiments of the invention are mainly described in relation to serving equipment of a telecommunications network, it will be appreciated that embodiments of the invention may be utilized in many different types of visual remote guidance applications, such as serving vehicles (e.g., cars, lorries, trains, and airplanes), serving household appliances (e.g., dishwashers, washing machines, fridges, and heat pumps), serving computers and network equipment in data centers, monitoring construction work, surveillance (e.g., by security guards or law enforcement personnel), and so forth.

Figure 1:
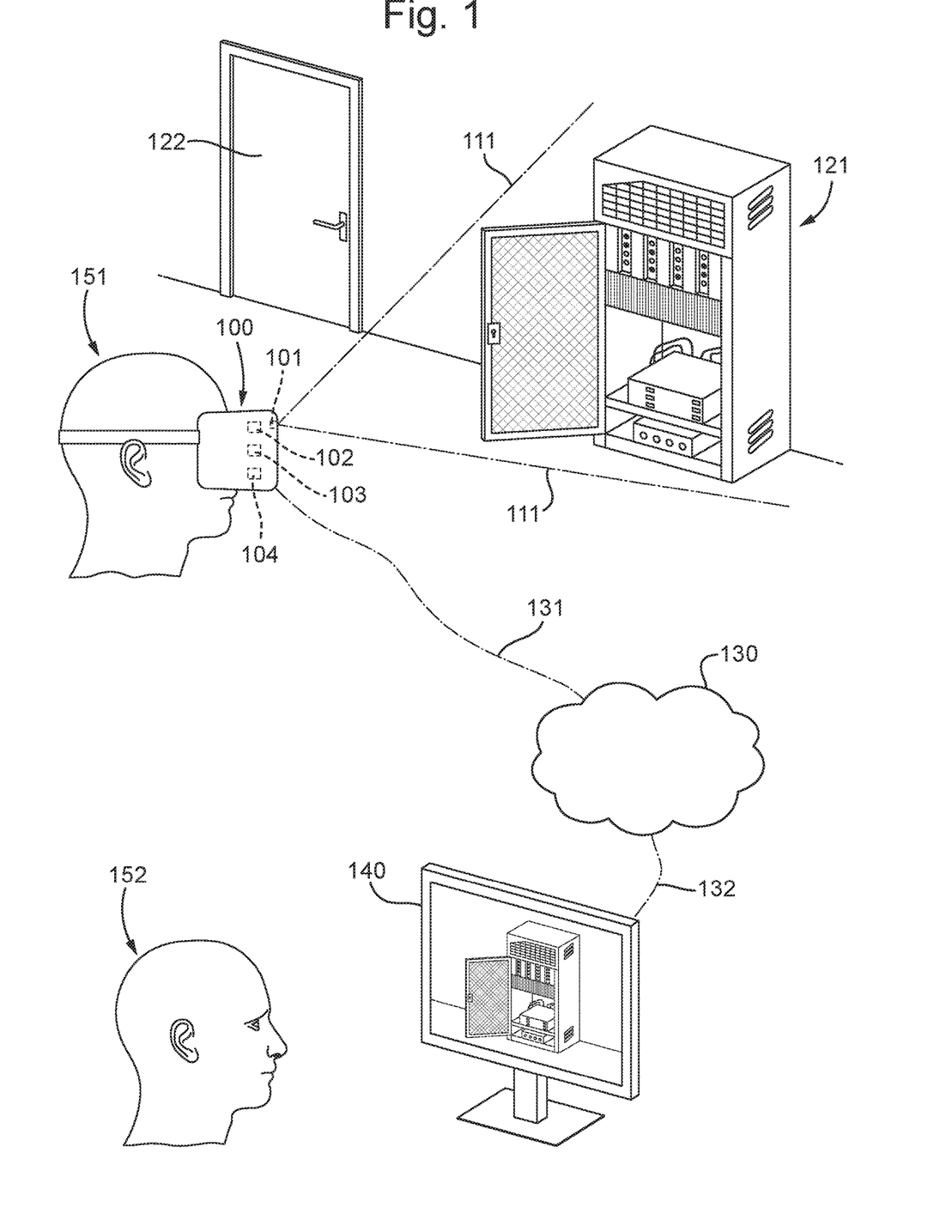
FIG. 1 illustrates an HMD in a remote collaboration scenario, in accordance with embodiments of the invention.

In FIG. 1, an HMD 100 is illustrated, in accordance with embodiments of the invention. The HMD 100 comprises a camera 101 which is configured to capture a video of a real-world scene with a first field-of-view (FoV) 111. The camera 101 may, e.g., be a front-facing camera which captures the scene in front of the user 151 wearing the HMD 100. The HMD 100 further comprises a network interface circuit 102 which is configured to stream video to a receiving display device 140, where it may be rendered and displayed to a viewer 152. As is illustrated in FIG. 1, the person 151 wearing the HMD 100 (herein referred to as the "user") and the viewer 152 may be in different, potentially remote, locations. In the remainder, it is assumed that the user 151 and the viewer 152 are remotely collaborating. For instance, the user 151 may be a support engineer visiting a radio base station site of a telecommunications network, at which a radio base station cabinet 121 is deployed. The viewer 152, viewing the live video stream captured by the camera 101 using the receiving display device 140, may be an expert guiding and/or assisting the support engineer (the viewer) 151.

The network interface circuit 102 may, e.g., be based on any known wired or wireless communications technology. For example, the network interface circuit 102 may be based on a short-range radio technology like Wireless Local Arena Network (WLAN)/Wi-Fi or Bluetooth, or a cellular radio technology like Global System for Mobile communications (GSM), Universal Mobile Telecommunications System (UMTS), Long Term Evolution (LTE), or a 5G technology based on NR/NX. Communications, i.e., exchange of data, between the HMD 100 and the receiving display device 140, in particular streaming of video, may commence using any suitable protocol, e.g., the HyperText Transfer Protocol (HTTP), the Constrained Application Protocol (CoAP), the Real-time Streaming Protocol (RTSP), the Real-time Transport Protocol (RTP), the Real-time Transport Control Protocol (RTCP), Dynamic Adaptive Streaming over HTTP (DASH), or the like. As is exemplified in FIG. 1, communications between the HMD 100 and the receiving display device 140 may be transported via wired or wireless connections 131 and 132 and one or more communications networks 130, e.g., the Internet.

The HMD 100 further comprises processing means 103 which is operative to cause the HMD 100 to perform in accordance with embodiments of the invention set forth herein. More specifically, the HMD 100 is operative to generate a 3D model of the real-world scene, and to generate a video from the 3D model using a second FoV which is wider than the first FoV 111, i.e., a "zoomed-out" view of the real-world scene. The 3D model may, e.g., be generated from the video captured by the camera 101 (for this purpose, the camera 101 needs to zoom out, i.e., increase its FoV 111) and/or from an additional camera comprised in the HMD 100, e.g., forming a stereoscopic camera. As an alternative, or in addition, the 3D model may be generated from one or more depth sensors, e.g., using LIDAR or similar radar technologies, or other types of 3D scanners, LIDAR measures distance to a target object by illuminating the object with pulsed laser light and detecting the reflected pulses with a sensor. Differences in laser return times and wavelengths can then be used to generate a 3D representation, i.e., 3D model, of the object and, accordingly, a model of a real-world scene comprising a plurality of objects.

The 3D model may, e.g., be generated, stored, and processed, as a point cloud. In general, a point cloud is a set of data points in some coordinate system. Based on the point cloud, a 3D surface can be generated using a number of methodologies known in the field of computer graphics. An overview over methods for reconstructing surfaces from point clouds has been given by M. Berger, A. Tagliasacchi, L. M. Seversky, P. Alliez, G. Guennebaud, J. A. Levine, A. Sharf, and C. T. Silva, "A Survey of Surface Reconstruction from Point Clouds", Computer Graphics Forum, Volume 36, pages 301-329, Wiley, 2017. As an example, real-time mapping of indoor scenes using a moving low-cost depth camera (a Microsoft Kinect sensor) has been reported by R. A. Newcombe, S. Izadi, G. Hilliges, D. Molyneaux, D. Kim, A. J. Davison, P. Kohi, J. Shotton, S. Hodges, and A. Fitzgibbon, "KinectFusion: Real-time dense surface mapping and tracking", 10th IEEE International Symposium on Mixed and Augmented Reality (ISMAR), pages 127-136, IEEE, 2012. As a further example, real-time 3D reconstruction of a space including people, furniture, and objects, using stereo depth cameras has been demonstrated by S. Orts-Escolano et al., "Holoportation: Virtual 3D Teleportation in Real-time", Proceedings of the 29th Annual Symposium on User Interface Software and Technology (UIST '16), pages 741-754, ACM, 2016.

The video may subsequently be generated from the 3D model, e.g., as represented by a point cloud, as is known in the field of computer graphics. This may, e.g., be achieved by using readily available software, such as the Point Cloud Library (PCL) (http://pointclouds.org/), a framework for 2D/3D image and point cloud processing, the Open Graphics Library (OpenGL) (https://www.opengl.org/), a library for rendering 2D and 3D vector graphics, or Unity 3D (https://unity3d.com/), a game engine for rendering 2D and 3D video.

The HMD 100 is further operative to estimate a motion of the camera 101. For instance, the HMD 100 may further comprise at least one motion sensor 104 configured to sense a motion of the HMD 100, such as accelerometers, gyroscopes, magnetometers, Global Positioning System (GPS) sensors, or the like. The HMD 100 is operative to estimate the motion of the camera 101 based on the sensed motion of the HMD 100, by analyzing measurement data and/or signals received from the motion sensor(s) 104 and based on the geometry of the HMD 100, in particular a distance between the camera 101 and the motion sensor(s) 104. More specifically, the HMD 100 may be operative to estimate at least one of a rotational motion, a tilting motion, or a translational motion, of the camera 101, which is caused by a corresponding motion of the head of the user 151 wearing the HMD 100.

As an alternative, the HMD 100 may be operative to estimate the motion of the camera 101 based on analyzing subsequent frames of the video captured by the camera 101. This may, e.g., be achieved by means of (global) motion estimation which is known from video coding/compression. Motion estimation is the process of determining motion vectors which describe a transformation from one image to another, usually between adjacent frames in a video sequence, such as the video captured by the camera 101. This may, e.g., be achieved by utilizing a block matching algorithm for locating matching macroblocks in a sequence of video frames, as is known in the art.

The HMD 100 is further operative to determine if the estimated motion of the camera 101 satisfies one or more conditions which are indicative of rapid motion and, if so, stream the generated video to the receiving display device 140, i.e., the video generated from the 3D model using a second FoV which is wider than the first FoV 111. The HMD 100 is further operative, if the estimated motion of the camera 101 does not satisfy the one or more conditions which are indicative of rapid motion, to stream the captured video to the receiving display device 140, i.e., the video captured by the camera 101 using the first FoV 111. The one or more conditions indicative of rapid motion are preferably indicative of a motion regime in which viewers of the captured video are likely to suffer from VIMS.

The one or more conditions may, e.g., be threshold values for any one, or a combination of, a translational speed or velocity, a translational acceleration, a rotational speed or velocity, and a rotational acceleration. In this respect, the HMD 100 may be operative to determine if the estimated motion of the camera 101 satisfies the one or more conditions which are indicative of rapid motion by comparing the estimated motion of the camera 101 to one or more threshold values. For instance, the HMD 100 may be operative to determine that the estimated motion of the camera 101 satisfies the one or more conditions which are indicative of rapid motion if the estimated motion exceeds the one or more threshold values. This may, e.g., be the case if the user 151 wearing the HMD 100 moves his/her head rapidly, by translation (moving forward/backward/left/right), rotation (turning left/right), or by tilting (forward/backward/left/right), is/her head.

As an example, the HMD 100 may be operative to keep track the motion of the camera 101 by averaging, and potentially weighting, several estimated motion values of the camera 101 over a certain period of time, e.g., between a few tenths of a second and a few seconds. Preferably, the current value for the averaged estimated motion of the camera 101, is calculated regularly, e.g., for each vide frame captured by the camera 101, i.e., at the frame rate of the captured video. Alternatively, the current value for the averaged estimated motion of the camera 101 may be calculated for every n-th frame (i.e., at 1/n of the frame rate), where n is a positive integer. For instance, at a current time to, the current averaged estimated motion of the camera 101 may be calculated as:

$$V_{ave}(t_0) = \Sigma_{n=0}^{N}[w(t_n) \cdot V(t_n)],$$

where V(t) is the estimated motion of the camera 101 at time t, and the weight function w(t) is selected such that:

$$\Sigma_{n=0}^{N} w(t_n) = 1, \text{ and } w(t_i) < w(t_j) \text{ for } t_i < t_j.$$

In this particular example, the estimated motion of the camera 101, V(t), may be any velocity component, such as a translational or rotational velocity component, an absolute value of a translational or rotational velocity, or a combination thereof.

The one or more threshold values may, e.g., be configured by a manufacturer of the HMD 100, a provider of a software used for remote collaboration, which software is executed by the processing means 103, or by the user 151. Threshold values may be expressed as absolute or relative values. With reference to the above example, the condition indicative of rapid motion may, e.g., considered to be satisfied if the current estimated motion of the camera 101, $V(t_0)$, exceeds the current averaged estimated motion of the camera 101, $V_{ave}(t_0)$, by a certain amount, i.e., if $$V(t_0) > a \cdot V_{ave}(t_0),$$

where a>1. For instance, if a=1.5, the condition indicative of rapid motion is satisfied if the current estimated motion of the camera 101 exceeds its current averaged motion by at least 50%.

Optionally, the one or more threshold values may be learned and adjusted during normal operation. For instance, the receiving display device 140 may be operative to detect if the viewer 152 suffers from VIMS and notify the HMD 100 accordingly. Corresponding, the HMD 100 may be operative, upon receiving such a notification, to record estimated motion values, such as translational/rotational speed/velocity or acceleration, which trigger VIMS. Based on such recorded estimated motion values, the HMD 100 may be operative to determine one or more threshold values which are selected so as to minimize the risk that the viewer 152 suffers from VMS. For instance, based on the recorded estimated motion values, the threshold values may be set at a lower bound, or just below the lower bound, of the recorded estimated motion values which trigger VIMS.

Embodiments of the invention are advantageous in that the risk of a person (such as the viewer 152) viewing a video stream which is received from, and captured by, a non-stationary camera (such as the camera 101 comprised in the HMD 100 worn by the user 151) is reduced. This is achieved by switching between streaming the video captured by the camera 101 if the HMD 100 is not moving rapidly, i.e., if the estimated motion of the camera 101 does not satisfy the one or more conditions indicative of rapid motion, and streaming a video which is generated from a 3D model of the real-world scene using a second FoV which is wider than the first FoV 111 of the camera 101, if the HMD 100 is moving rapidly, to the receiving display device 140. By zooming out from the first FoV 111 of camera 101 to a larger second FoV for the generated video, additional reference points from the real-word scene, such as door 122 shown in FIG. 1, become visible in the streamed (generated) video which is displayed to the viewer 152. Accordingly, the risk for the viewer 152 of suffering from VIMS is reduced, or even mitigated.

Optionally, the HMD 100 may be operative to generate the 3D model of the real-world scene only if the estimated motion of the camera 101 satisfies the one or more conditions indicative of rapid motion. Thereby, the amount of processing required for generating the 3D model from the captured video, and/or data received from additional cameras and/or depth sensors, is reduced, which advantageously results in an increased battery lifetime of the HMD 100.

Optionally, the HMD 100 may be operative to generate the video from the 3D model using a second FoV which is wider than the first FoV only if the estimated motion of the camera 101 satisfies the one or more conditions indicative of rapid motion. Thereby, the amount of processing which is required to generate the video from the 3D model is reduced, which advantageously results in an increased battery lifetime of the HMD 100.

Figure 2A:
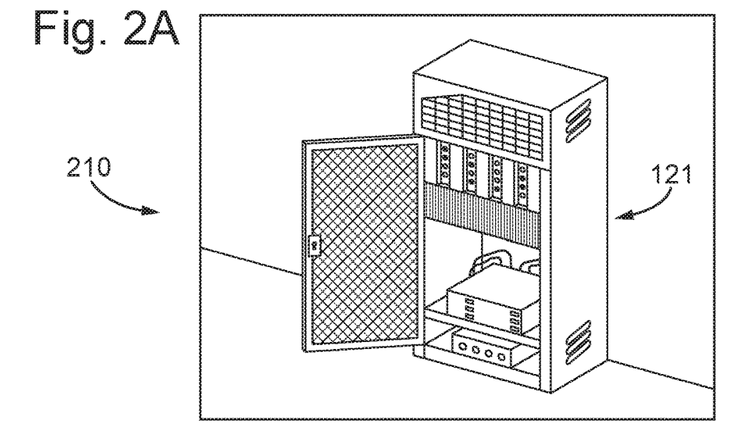
FIG. 2 illustrates streaming video by the HMD, in accordance with embodiments of the invention.

The switching between different video representations by the HMD 100, i.e., between captured video and generated video, depending on whether the estimated motion of the camera 101 satisfies one or more conditions indicative of rapid motion, in accordance with embodiments of the invention, is further illustrated in FIG. 2. More specifically, FIG. 2A exemplifies a frame 210 of the video captured by the camera 101, when the user 151 wearing the HMD 100 is facing the radio base station cabinet 121, as is depicted in FIG. 1, in which the captured video frame 210 is displayed on the receiving display device 140.

Figure 2B:
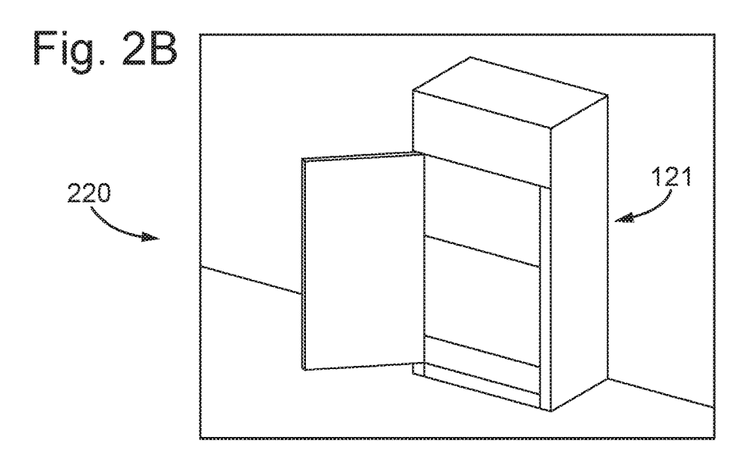
Figure 2C:
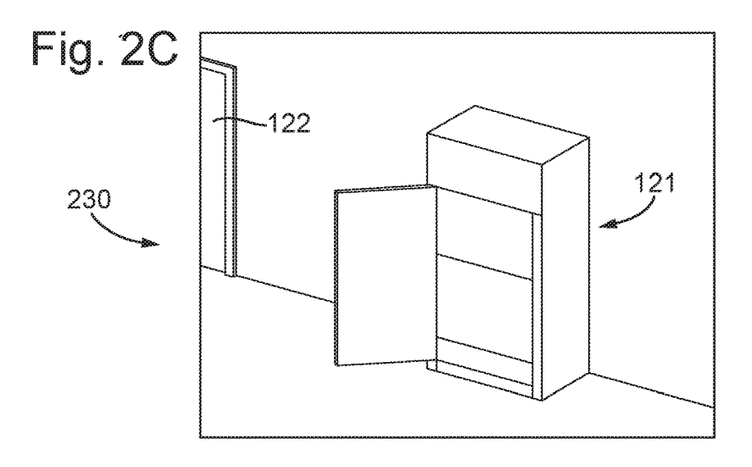

In FIG. 2B, a video frame 220 is exemplified which is generated from the 3D model of the real-world scene which the user 151 is observing. It will be appreciated that the frame 220 shown in FIG. 2B is generated from a 3D model of the real-world scene and is typically less detailed than the frame 210 shown in FIG. 2A, which is captured by the camera 101. The level of detail, in particular with respect to details, surface texture, and the like, is typically dependent on the processing resources which are available for generating the video from the 3D model, Note that the frame 220 is generated with substantially the same FoV as the captured frame 210, i.e., the first FoV 111 of the camera 101. In contrast, FIG. 2C illustrates a frame 230 which is generated from the 3D model of the real-world scene with a FoV which is wider than the first FoV 111 of the camera 101 used for capturing the frame 210. In other words, the frame 230 provides a zoomed-out view of the real-world scene which is in front of the user 151 wearing the HMD 100, generated from a 3D model of the real-world scene. Advantageously, the zoomed-out view of the frame 230, as compared to the frame 220, contains an additional reference point in the real-world scene, the door 122. Owing to this additional reference point, the risk for the remote viewer 152 to suffer from VIMS is reduced, or even mitigated.

Further with reference to FIG. 1, the HMD 100 may be operative to stream the generated video to the receiving display device 140 if the estimated motion of the camera 101 satisfies one or more conditions indicative of rapid motion and the first FoV 111 is smaller than a threshold value which is representative of the human FoV. Else, the HMD 100 is operative to stream the captured video to the receiving display device 140. The threshold value which is representative of the human FoV may, e.g., be configured by a manufacturer of the HMD 100, a provider of a software used for remote collaboration, which software is executed by the processing means 103, or by the user 151, and may present a generic value for the human FoV or a specific value representing the FoV of the viewer 152.

The HMD 100 may further be operative to determine the second FoV based on the first FoV 111 and the estimated motion of the camera 101. For instance, the second FoV may be selected such that at least one additional reference point is visible in the generated video. The presence of additional reference points, and their respective location with respect to a current first FoV 111 of the camera 101, may be determined based on the generated 3D model of the real-world scene and the estimated motion of the camera 101. The latter may be used to determine to which extend the FoV needs to be widened so as to make a reference point in the real-world scene visible in the generated video. In particular, this is the case for reference points which are about to become visible in the generated video, owing to the motion of the camera 101 and the associated motion of the first FoV 111. The presence of additional reference points in the generated video which is streamed to the receiving display device 140 reduces the risk for the viewer 152 to suffer from VIMS. Alternatively, the second FoV may be preconfigured by a manufacturer of the HMD 100, a provider of a software used for remote collaboration, which software is executed by the processing means 103, by the user 151, or by the viewer 152. For instance, the receiving display device 140 may be operative to enable the viewer 152 to adjust the second FoV by changing a setting on the receiving display device 140, which setting is signaled to the HMD 100.

The HMD 100 may further be operative, subsequent to streaming the generated video to the receiving display device 140, to stream the captured video to the receiving display device 140 in response to at least one of: streaming the generated video for a predetermined duration of time, and determining that the estimated motion of the camera 101 satisfies one or more conditions indicative of stabilized motion. In other words, the HMD 100 is operative to switch back to streaming the captured video if, e.g., the estimated motion of the camera 101 satisfies the one or more conditions indicative of rapid motion for a certain period of time, such as five seconds. This period of time is selected so as to allow the brain of the viewer 152 to adapt to the rapid motion, e.g., owing to the additional reference points which are visible in the zoomed-out generated video. The HMD 100 may be operative to determine that the estimated motion of the camera 101 satisfies one or more conditions indicative of stabilized motion based on one or more threshold values, similar to what has been described hereinbefore with reference to determining if the estimated motion of the camera 101 satisfies one or more conditions indicative of rapid motion. For instance, if the one or more conditions which are indicative of rapid motion are expressed as exceeding a threshold value for a measured acceleration, either translational or rotational, of the HMD 100 or the camera 101, the one or more conditions indicative of stabilized motion may be expressed in terms of the estimated motion of the camera 101 not exceeding, i.e., being smaller than, a corresponding threshold value for the measured acceleration. The sets of the one or more threshold values for detecting rapid motion and stabilized motion, respectively, may either be identical or not. Advantageously, different values are used so as to provide a hysteresis effect and to prevent rapid back-and-forth switching between streaming the captured video and streaming the zoomed-out generated video. Alternatively, a timer may be used to guarantee that the captured video is streamed for a certain period of time before the HMD 100 switches to streaming the zoomed-out generated video, or vice versa.

Whereas embodiments of the invention have mainly been described with reference to the HMD 100, it will be appreciated that embodiments of the invention may be based on camera devices other than HMDs. For instance, embodiments of the invention may be implemented in a mobile phone, a smartphone, a tablet, a digital camera, or the like, which can be held in the hand of the user 151 or be attached to a body part of the user 151. As an example, embodiments of the invention may be implemented in a head-mounted camera, e.g., a GoPro camera, which is attached to the head of the user 151 or a helmet worn by the user 151.

In the following, embodiments of the processing means 103 comprised in embodiments of the HMD, such as the HMD 100, are described with reference to FIGS. 3 and 4.

Figure 3:
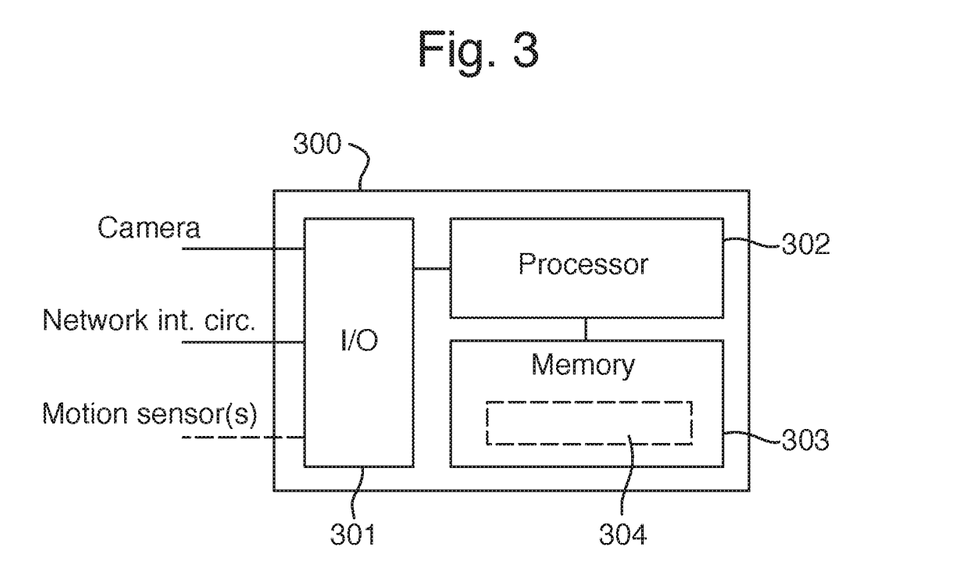
FIG. 3 shows an embodiment of the processing means comprised in the HMD.

A first embodiment 300 of the processing means 103 is shown in FIG. 3. The processing means 300 comprises a processing unit 302, such as a general-purpose processor, and a computer-readable storage medium 303, such as a Random-Access Memory (RAM), a Flash memory, or the like. In addition, the processing means 300 comprises one or more interfaces 301 ("I/O" in FIG. 3) for controlling and/or receiving information from other components comprised in the HMD, such as the camera 101, the network interface circuit 102, and the motion sensor(s) 104. The memory 303 contains computer-executable instructions 304, i.e., a computer program or software, to cause the HMD to become operative to perform in accordance with embodiments of the invention as described herein, when the computer-executable instructions 304 are executed on the processing unit 302.

Figure 4:
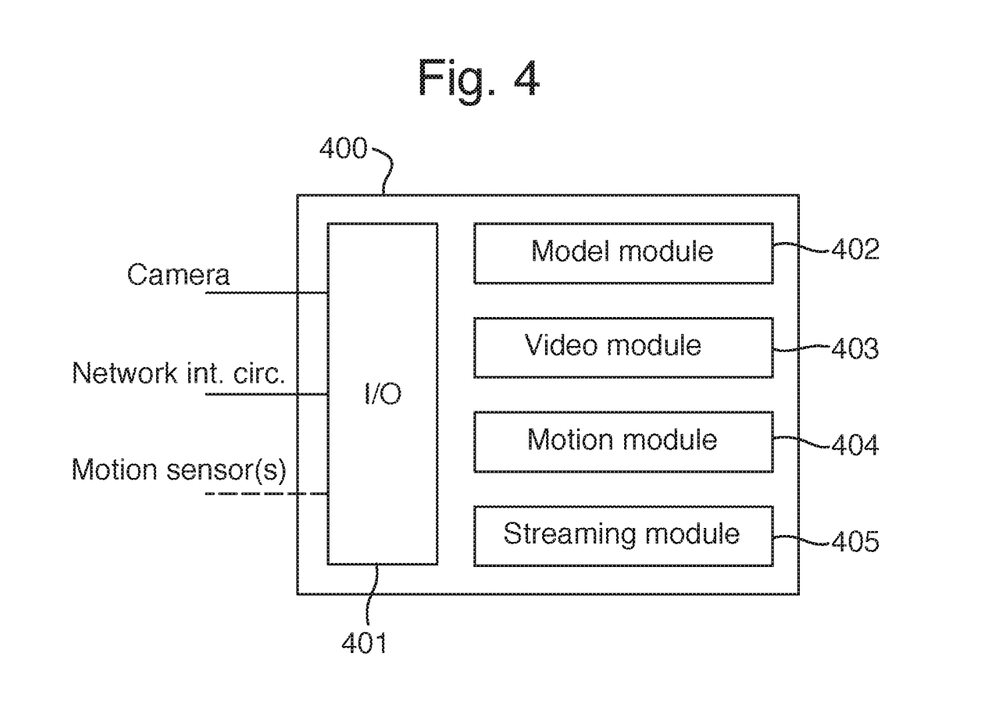
FIG. 4 shows another embodiment of the processing means comprised in the HMD.

An alternative embodiment 400 of the processing means 103 is illustrated in FIG. 4. Similar to the processing means 300, the processing means 400 comprises one or more interfaces 401 "I/O" in FIG. 4) for controlling and/or receiving information from other components comprised in the HMD, such as the camera 101, the network interface circuit 102, and the motion sensor(s) 104. The processing means 400 further comprises a model module 402, a video module 403, a motion module 404, and a streaming module 405, which are configured to cause the HMD to perform in accordance with embodiments of the invention as described herein.

In particular, the model module 402 is configured to generate a 3D model of the real-world scene, and the video module 403 is configured to generate a video from the 3D model using a second FoV which is wider than the first FoV 111. Motion module 404 is configured to estimate a motion of the camera 101. Streaming module 405 is configured to stream the generated video to the receiving display device 140 if the estimated motion of the camera satisfies one or more conditions indicative of rapid motion, else stream the captured video to the receiving display device 140. Preferably, the one or more conditions indicative of rapid motion are indicative of a motion regime in which viewers of the captured video suffer from VIMS.

Optionally, the streaming module 405 may be configured to stream the generated video to the receiving display device 140 if the estimated motion of the camera 101 satisfies one or more conditions indicative of rapid motion and the first FoV 111 is smaller than a threshold value representative of the human FoV, else stream the captured video to the receiving display device 140.

Optionally, the motion module 404 may be configured to estimate the motion of the camera 101 based on the sensed motion of the HMD 100. Alternatively, the motion module 404 may be configured to estimate the motion of the camera 101 based on analyzing subsequent frames of the captured video.

Optionally, the video module 403 may be configured to determine the second FoV based on the first FoV 111 and the estimated motion of the camera 101.

Optionally, the streaming module 405 may further be configured to stream the captured video to the receiving display device 140 subsequent to streaming the generated video to the receiving display device 140 and in response to at least one of streaming the generated video for a predetermined duration of time, and determining that the estimated motion of the camera 101 satisfies one or more conditions indicative of stabilized motion.

The modules 402-405 comprised in the processing mean 400 may further be configured to perform additional or alternative operations in accordance with embodiments of the invention, as described herein.

The interfaces 301 and 401, and the modules 402-405, as well as any additional modules comprised in the processing means 400, may be implemented by any kind of electronic circuitry, e.g., any one, or a combination of, analogue electronic circuitry, digital electronic circuitry, and processing means executing a suitable computer program, i.e., software.

Figure 5:
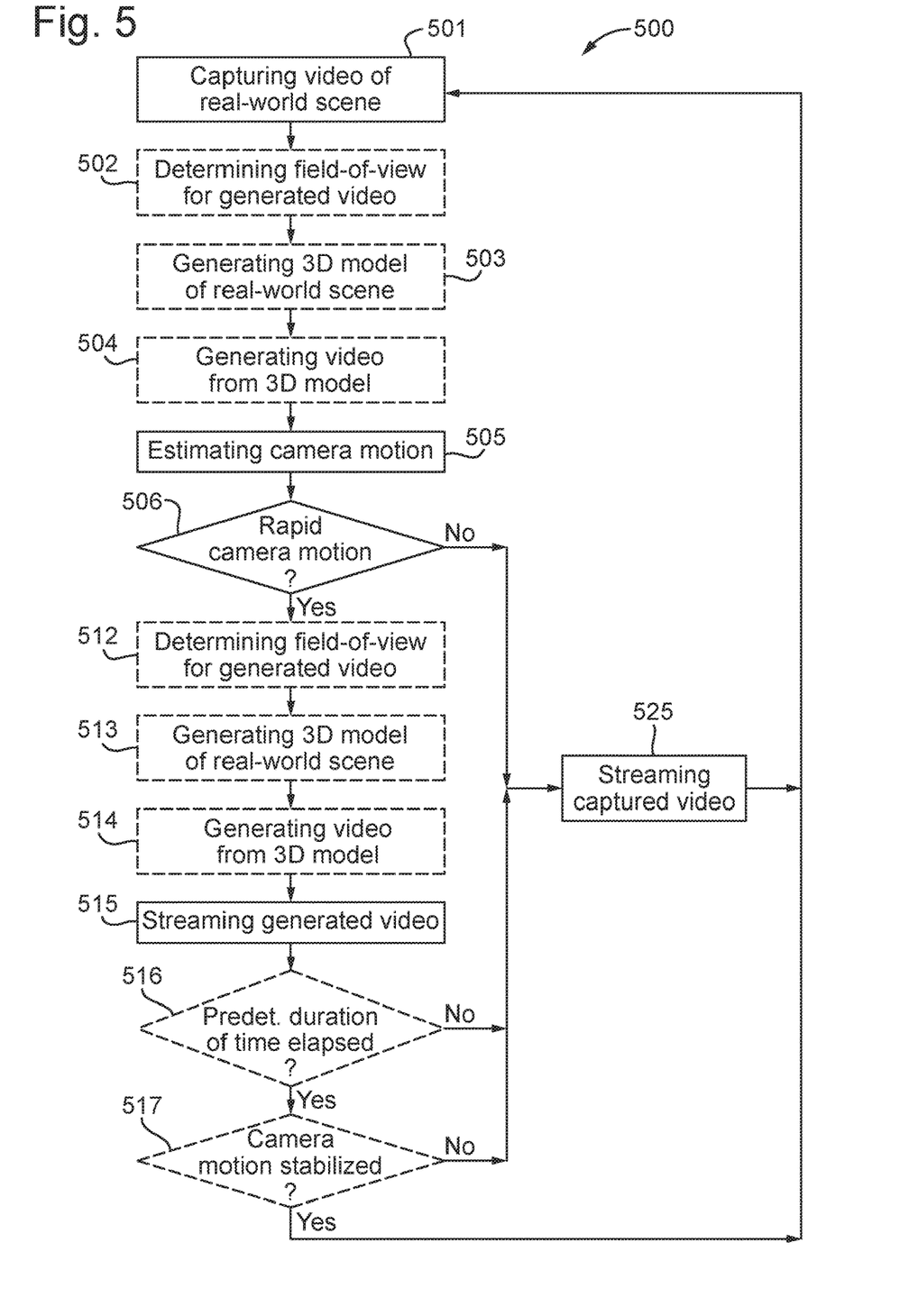
FIG. 5 shows a method performed by an HMD, in accordance with embodiments of the invention.

In the following, embodiments 500 of the method of performed by an HMD, such as the HMD 100, are described with reference to FIG. 5.

The method 500 comprises capturing 501 a video of a real-world scene with a first FoV using a camera 101 comprised in the HMD 100, generating 503/513 a 3D model of the real-world scene, and generating 504/514 a video from the 3D model using a second FoV which is wider than the first FoV 111. Method 500 further comprises estimating 505 a motion of the camera 101, and streaming 515 the generated video to a receiving display device 140 using a network interface circuit 102 comprised in the HMD 100 if the estimated motion of the camera 101 satisfies 506 one or more conditions indicative of rapid motion, else streaming 525 the captured video to the receiving display device 140 using the network interface circuit 102. Preferably, the one or more conditions indicative of rapid motion are indicative of a motion regime in which viewers of the captured video suffer from VIMS.

Optionally, the generated 504 video is streamed 515 to the receiving display device 140 if the estimated 505 motion of the camera 101 satisfies 506 one or more conditions indicative of rapid motion and the first FoV 111 is smaller than a threshold value representative of the human FoV, else the captured video is streamed 525 to the receiving display device 140.

Optionally, the motion of the camera 101 is estimated 505 based on a sensed motion of the HMD 100 using at least one motion sensor 104 comprised in the HMD 100. Alternatively, the motion of the camera 101 is estimated 505 based on analyzing subsequent frames of the captured 501 video.

Optionally, method 500 may further comprise determining 512 the second FoV based on the first FoV 111 and the estimated 505 motion of the camera 101.

Optionally, method 500 further comprises streaming 525 the captured video to the receiving display device 140 subsequent to streaming 515 the generated video to the receiving display device 140 and in response to at least one of streaming 516 the generated video for a predetermined duration of time and determining that the estimated motion of the camera satisfies 517 one or more conditions indicative of stabilized motion.

It will be appreciated that the method 500 may comprise additional, or modified, steps in accordance with what is described throughout this disclosure. An embodiment of the method 500 may be implemented as software, such as the computer program 304, to be executed by a processing unit comprised in an HMD, whereby the HMD becomes operative to perform in accordance with embodiments of the invention described herein.

The person skilled in the art realizes that the invention by no means is limited to the embodiments described above. On the contrary, many modifications and variations are possible within the scope of the appended claims.

The invention claimed is:

1. A Head-Mounted Display, HMD, comprising:
   a camera configured to capture a video of a real-world scene with a first field-of-view;
   a network interface circuit configured to stream the captured video to a receiving display device;
   at least one motion sensor configured to sense a motion of the HMD;
   a processing circuit configured to being operative to:
      estimate a motion of the camera based on the sensed motion of the HMD and further based on a distance between the camera and the at least one motion sensor;
      determine whether the estimated motion of the camera satisfies one or more conditions indicative of rapid motion, wherein the one or more conditions indicative of the rapid motion comprise estimated motion greater than a threshold value for a translational speed or velocity of the camera, a translational acceleration of the camera, a rotational speed or velocity of the camera, and/or a rotational acceleration of the camera;
      in response to determining that the estimated motion of the camera satisfies the one or more conditions indicative of the rapid motion, generate a video from a 3D model of the real-world scene, and stream the generated video instead of the captured video to the receiving display device via the network interface circuit, wherein the generated video has a second field-of-view which is wider than the first field-of-view; and
      in response to determining that the estimated motion of the camera does not satisfy the one or more conditions indicative of the rapid motion, stream the captured video to the receiving display device via the network interface circuit, wherein the captured video is the video of the real-world scene with the first field-of-view captured by the camera.

2. The HMD according to claim 1, the processing circuit being operative to, if the estimated motion of the camera satisfies one or more conditions indicative of rapid motion and the first field-of-view is smaller than a threshold value representative of the human field-of-view, stream the generated video to the receiving display device, else stream the captured video to the receiving display device.

3. The HMD according to claim 1, the processing circuit being operative to estimate the motion of the camera based on analyzing subsequent frames of the captured video.

4. The HMD according to claim 1, the processing circuit being further operative to determine the second field-of-view based on the first field-of-view and the estimated motion of the camera.

5. The HMD according to claim 1, wherein the one or more conditions indicative of rapid motion are indicative of a motion regime in which viewers of the captured video suffer from Visually Induced Motion Sickness, VIMS.

6. The HMD according to claim 1, the processing circuit being further operative, subsequent to streaming the generated video to the receiving display device, to stream the captured video to the receiving display device in response to streaming the generated video for a predetermined duration of time.

7. The HMD according to claim 1, wherein the processing circuit is further operative to
   switch to streaming the captured video instead of the generated video to the receiving display device in response to determining that the estimated motion of the camera changes to satisfy one or more conditions indicative of stabilized motion, after the generated video is still streamed for a predetermined or certain duration of time when the estimated motion of the camera changes to satisfy one or more conditions indicative of stabilized motion from rapid motion, and
   switch to streaming the generated video instead of the captured video to the receiving display device in response to determining that the estimated motion of the camera changes to satisfy one or more conditions indicative of rapid motion, after the captured video is still streamed for a predetermined or certain duration of time when the estimated motion of the camera changes to satisfy one or more conditions indicative of rapid motion from stabilized motion.

8. A method performed by a Head-Mounted Display, HMD, the method comprising:
   capturing a video of a real-world scene with a first field-of-view using a camera comprised in the HMD;
   estimating a motion of the camera based on a sensed motion of the HMD using at least one motion sensor comprised in the HMD and further based on a distance between the camera and the at least one motion sensor;
   determining whether the estimated motion of the camera satisfies one or more conditions indicative of rapid motion, wherein the one or more conditions indicative of the rapid motion comprise estimated motion greater than a threshold value for a translational speed or velocity of the camera, a translational acceleration of the camera, a rotational speed or velocity of the camera, and/or a rotational acceleration of the camera;
   in response to determining that the estimated motion of the camera satisfies the one or more conditions indicative of the rapid motion, generating a video from a 3D model of the real-world scene, and streaming the generated video instead of the captured video to a receiving display device using a network interface circuit comprised in the HMD, wherein the generated video has a second field-of-view which is wider than the first field-of-view; and
   in response to determining that the estimated motion of the camera does not satisfy the one or more conditions indicative of the rapid motion, streaming the captured video to the receiving display device using the network interface circuit, wherein the captured video is the video of the real-world scene with the first field-of-view captured by the camera.

9. The method according to claim 8, wherein, if the estimated motion of the camera satisfies one or more conditions indicative of rapid motion and the first field-of-view is smaller than a threshold value representative of the human field-of-view, the generated video is streamed to the receiving display device, else the captured video is streamed to the receiving display device.

10. The method according to claim 8, wherein the motion of the camera is estimated based on analyzing subsequent frames of the captured video.

11. The method according to claim 8, further comprising determining the second field-of-view based on the first field-of-view and the estimated motion of the camera.

12. The method according to claim 8, wherein the one or more conditions indicative of rapid motion are indicative of a motion regime in which viewers of the captured video suffer from Visually Induced Motion Sickness, VIMS.

13. The method according to claim 8, further comprising, subsequent to streaming the generated video to the receiving display device, streaming the captured video to the receiving display device in response to streaming the generated video for a predetermined duration of time.

14. A computer program on a non-transitory computer-readable storage medium comprising computer-executable instructions for causing a Head-Mounted Display, HMD, to perform the method according to claim 8, when the computer-executable instructions are executed on a processing unit comprised in the HMD.

15. The method according to claim 8, further comprising:
switching to streaming the captured video instead of the generated video to the receiving display device in response to determining that the estimated motion of the camera changes to satisfy one or more conditions indicative of stabilized motion, after the generated video is still streamed for a predetermined or certain duration of time when the estimated motion of the camera changes to satisfy one or more conditions indicative of stabilized motion from rapid motion; and
switching to streaming the generated video instead of the captured video to the receiving display device in response to determining that the estimated motion of the camera changes to satisfy one or more conditions indicative of rapid motion, after the captured video is still streamed for a predetermined or certain duration of time when the estimated motion of the camera changes to satisfy one or more conditions indicative of rapid motion from stabilized motion.

16. A mobile phone comprising:
a camera configured to capture a video of a real-world scene with a first field-of-view;
a network interface circuit configured to stream the captured video to a receiving display device;
at least one motion sensor configured to sense a motion of the mobile phone;
a processing circuit configured to being operative to:
estimate a motion of the camera based on the sensed motion of the mobile phone and further based on a distance between the camera and the at least one motion sensor;
determine whether the estimated motion of the camera satisfies one or more conditions indicative of rapid motion, wherein the one or more conditions indicative of the rapid motion comprise estimated motion greater than a threshold value for a translational speed or velocity of the camera, a translational acceleration of the camera, a rotational speed or velocity of the camera, and/or a rotational acceleration of the camera;
in response to determining that the estimated motion of the camera satisfies the one or more conditions indicative of the rapid motion, generate a video from a 3D model of the real-world scene, and stream the generated video instead of the captured video to the receiving display device via the network interface circuit, wherein the generated video has a second field-of-view which is wider than the first field-of-view, and
in response to determining that the estimated motion of the camera does not satisfy the one or more conditions indicative of the rapid motion, stream the captured video to the receiving display device via the network interface circuit, wherein the captured video is the video of the real-world scene with the first field-of-view captured by the camera.

17. The mobile phone according to claim 16, the processing circuit being operative to, if the estimated motion of the camera satisfies one or more conditions indicative of rapid motion and the first field-of-view is smaller than a threshold value representative of the human field-of-view, stream the generated video to the receiving display device, else stream the captured video to the receiving display device.

18. The mobile phone according to claim 16, the processing circuit being operative to estimate the motion of the camera based on analyzing subsequent frames of the captured video.

19. The mobile phone according to claim 16, wherein the processing circuit is further operative to
switch to streaming the captured video instead of the generated video to the receiving display device in response to determining that the estimated motion of the camera changes to satisfy one or more conditions indicative of stabilized motion, after the generated video is still streamed for a predetermined or certain duration of time when the estimated motion of the camera changes to satisfy one or more conditions indicative of stabilized motion from rapid motion, and
switch to streaming the generated video instead of the captured video to the receiving display device in response to determining that the estimated motion of the camera changes to satisfy one or more conditions indicative of rapid motion, after the captured video is still streamed for a predetermined or certain duration of time when the estimated motion of the camera changes to satisfy one or more conditions indicative of rapid motion from stabilized motion.

* * * * *